(Model.)

2 Sheets—Sheet 1.

J. MORAVA.
CHECK ROW CORN PLANTER.

No. 259,193.    Patented June 6, 1882.

WITNESSES:
Donn Twitchell
C. Sedgwick

INVENTOR:
J. Morava
BY
Munn & Co
ATTORNEYS.

(Model.) 2 Sheets—Sheet 2.
J. MORAVA.
CHECK ROW CORN PLANTER.
No. 259,193. Patented June 6, 1882.
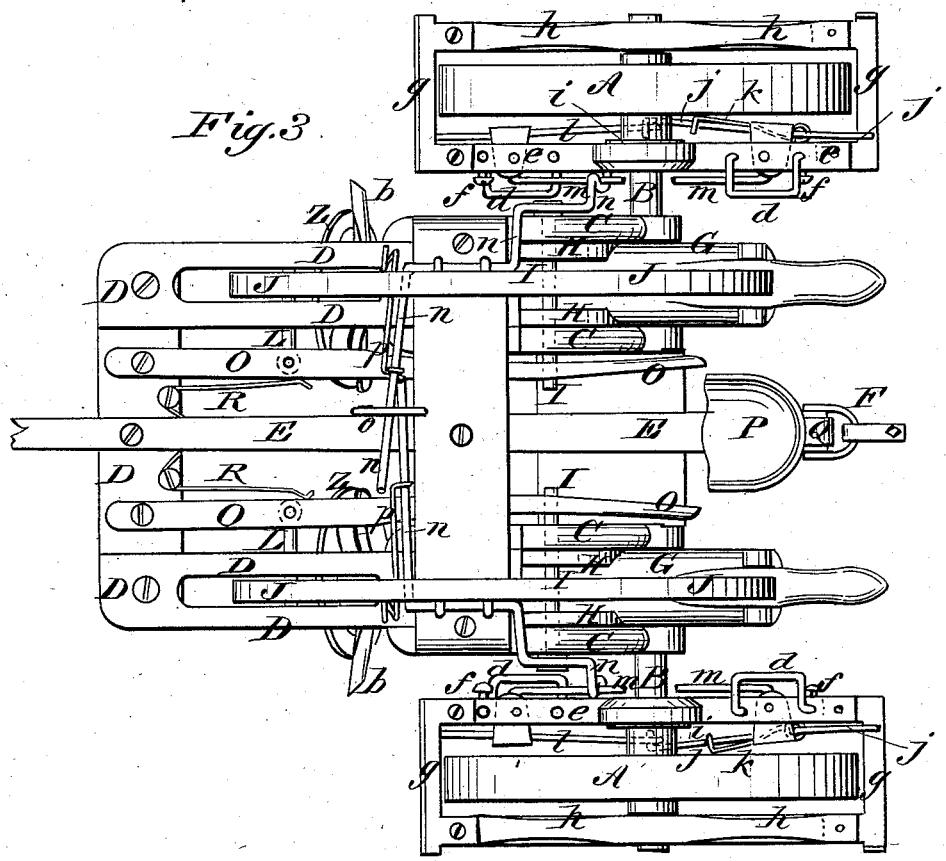
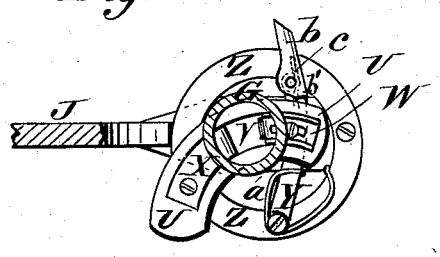
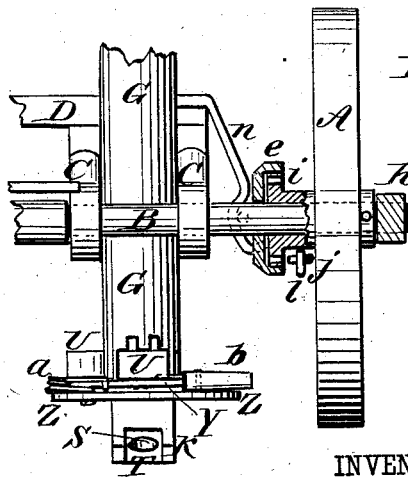
WITNESSES:
Donn Twitchell.
C. Sedgwick
INVENTOR:
J. Morava
BY Munn & Co
ATTORNEYS.
N. PETERS, Photo-Lithographer, Washington, D.C.

UNITED STATES PATENT OFFICE.

JOSEPH MORAVA, OF CASTLE ROCK, WISCONSIN.

CHECK-ROW CORN-PLANTER.

SPECIFICATION forming part of Letters Patent No. 259,193, dated June 6, 1882

Application filed July 18, 1881. (Model.)

To all whom it may concern:

Be it known that I, JOSEPH MORAVA, of Castle Rock, in the county of Grant and State of Wisconsin, have invented certain useful Improvements in Check-Row Corn-Planters, of which the following is a specification.

Figure 1:
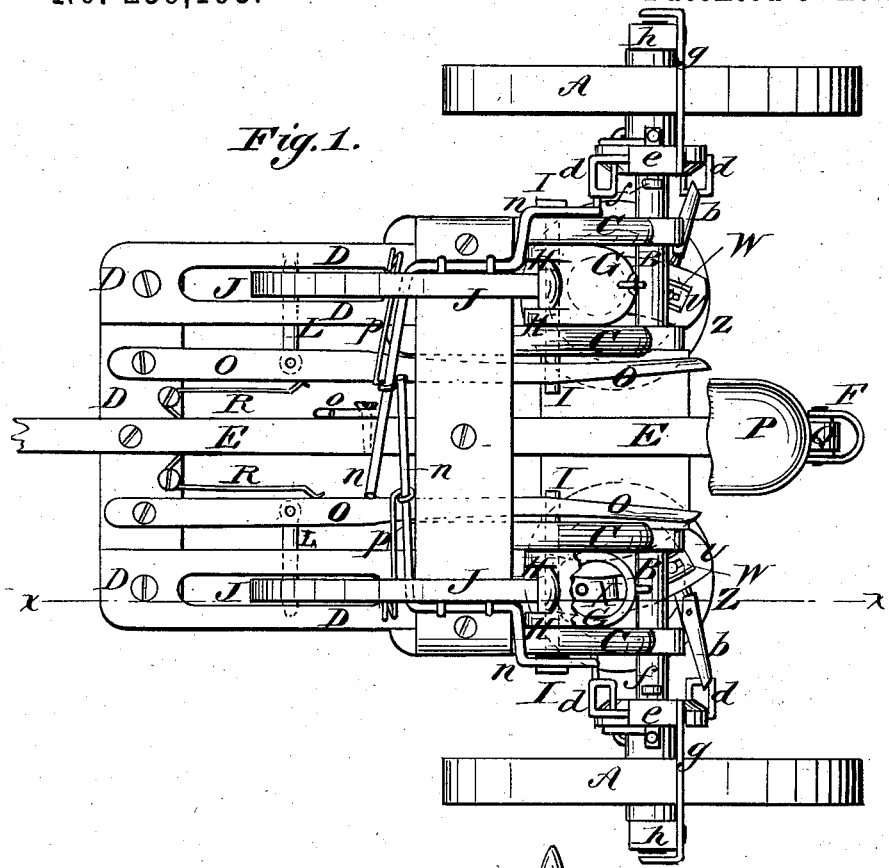
Figure 2:
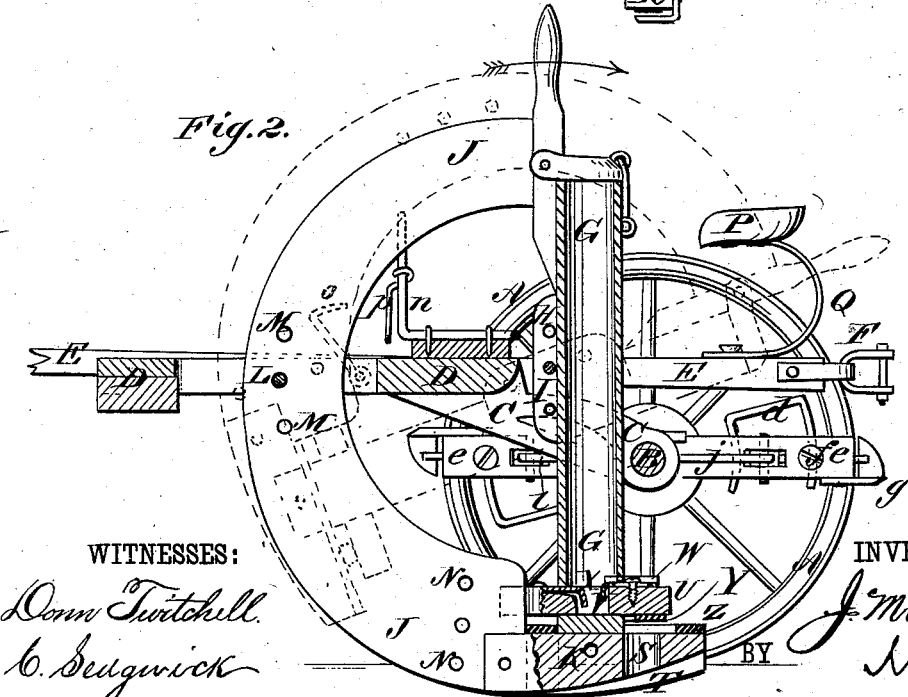

Figure 1, Sheet 1, is a plan view of my improvement, shown with the operating parts in position for work. Fig. 2, Sheet 1, is a sectional side elevation of the same, taken through the line $x\,x$, Fig. 1. Fig. 3, Sheet 2, is a plan view of the same, shown with the operating parts in position for turning and passing from place to place. Fig. 4, Sheet 2, is a sectional plan view of the lower part of a seed-box and its curved bar. Fig. 5, Sheet 2, is a rear elevation of a part of the planter.

Similar letters of reference indicate corresponding parts.

The object of this invention is to facilitate the planting of seeds in check-rows and promote convenience in taking the planter from place to place.

The invention consists in the peculiar construction and arrangement of the parts, as hereinafter more fully set forth, and pointed out in the claims.

A are the wheels of the planter, the axle B of which revolves in bearings in the lower ends of the two pairs of brackets C.

To the forward ends of the brackets C is attached the rear end of the frame D, to the middle part of which is attached the tongue E. The rear end of the tongue E projects in the rear of the frame D to receive clevises F for the attachment of rollers, harrows, or plows for covering the seed.

Between the brackets C of each pair, and between the axle B and the rear end of the frame D, is placed a seed-box, G, which is made in tubular form, and has lugs or flanges H upon its forward side to receive a pin or bolt, I, passing through holes in the brackets C. Several holes are formed in the flanges H to receive the pin or bolt I, so that the seed-box G can be raised and lowered to plant the seed deeper or shallower in the ground, as may be desired. The pin or bolt I also pivots the seed-box G, so that it can be swung into a horizontal position for convenience in passing from place to place.

To the forward side of the upper end of the tubular seed-box G is attached the upper end of a semicircular bar or plate, J, which passes through a slot in the side bar of the frame D. The lower end of the bar or plate J is attached to the forward end of the shoe K, attached to the lower end of the seed-box G. The seed-box G is secured in an erect position by a pin, L, which passes through holes in the slotted side bar of the frame D, and through holes M in the bar or plate J. The seed-box G is secured in a horizontal position by passing the pin L through holes N in the lower end of the bar or plate J. Several holes, M and N, are formed in the said bar or plate J to receive the pin L when the seed-box G is adjusted higher or lower. The inner end of the pin L is hinged to a lever, O, the forward end of which is hinged to the forward cross-bar of the frame D. The rear ends of the levers O project into such a position that they can be conveniently reached and operated by the driver from his seat P. The driver's seat P is attached to the upper end of a spring-standard, Q, the lower end of which is attached to the rear part of the tongue E. With this construction, by operating either or both of the levers O either or both of the seed-boxes G can be turned into a horizontal position, raising the marking mechanism away from the ground and throwing the seed-dropping mechanism out of gear, so that the machine can be turned around and taken from place to place without scattering seed. The upper ends of the tubular seed-boxes G are closed by hinged covers, which are secured by hooks and staples or other suitable fastenings to prevent the seed from spilling out when the said seed-boxes are adjusted into horizontal positions. The levers O are pressed outward to hold the pins L in gear with the bars or plates J by springs R, attached to the forward cross-bar of the frame D, and which press against the inner sides of the said levers O. The rear parts of the shoes K have apertures S formed through them, through which the seed drops to the ground. In the rear parts of the lower sides of the shoes K are formed grooves T to form spaces for the seed to prevent the said seed from being carried forward by the said shoes K. The seed is removed from the seed-boxes G and carried to the apertures of the shoes K by the seed-dropping slides U, which are curved upon the arcs of circles and pass through openings in the lower parts of the seed-boxes G, just above the shoes K. The slides U have apertures V formed through them to receive the seed. The size of the apertures V is regulated to contain the exact amount of seed required for a hill by small plates W, the inner parts of which are bent downward at right angles to enter the outer parts of the apertures V, so that the size of the said apertures V can be regulated by moving the said plates W forward or back. The outer parts of the plates W rest upon the upper sides of the rear ends of the shoes K, and have holes or slots formed through them to receive the screws by which the said plates are secured in place.

The upper sides of the forward parts of the seed-slides U are grooved or recessed, and to the said slides, within the said grooves or recesses, are secured springs X, the inner ends of which are bent downward to enter the forward ends of the apertures V to prevent kernels of grain from being crushed or injured by being caught between the edges of the seed-boxes G and the slides U at the forward ends of the apertures V, the springs X yielding and allowing the caught kernels to pass them. The lower side of the rear end of each slide U is pivoted to a bar, Y, the inner end of which is pivoted to the inner part of a circular or ring plate, Z, attached to the forward and rear parts of the upper side of the shoe K. The bars Y are pressed forward, holding the seed-dropping slides U in place to receive seed, by springs a, connected with the plates Z and the said bars Y.

To the outer ends of the bars Y are hinged arms b in such a manner, by means of a stop, b', (see Fig. 4,) that the outer ends of the said arms b cannot swing back any farther than to come into line with the bars Y, but can swing forward freely. The arms b are held in line with the bars Y by springs c, connected with the said arms and bars. The arms b and bars Y are forced back to draw back the slides U and drop the seed by the staples or rods d, the arms of which are bent at right angles, are passed through holes in the end parts of the cross-bars e, and are secured in place by set-screws f, so that the bends or working parts of the said rods d can be adjusted closer to or farther from the cross-bars e, according as it may be desired to operate the seed-dropping slides a little sooner or a little later to keep the hills in accurate check-row. The cross-bars e are placed at the inner sides of the wheels A, and have holes formed through their centers to receive the axle B. The cross-bars e are made a little longer than the diameter of the wheels A, and are connected at their ends by the marking-plates g with the ends of cross-bars h, placed at the outer sides of the wheels A, and having holes through their centers to receive the ends of the axle B. The marking-plates g cross the rims of the wheels A and are arranged in line with radii of the said wheels A, so as to enter and leave the ground readily and mark the ground distinctly. The middle parts of the inner cross-bars, e, are enlarged, and are recessed to receive the small wheels i, attached to the inner ends of the hubs of the wheels A. The wheels i have numerous holes formed through them, or teeth formed upon their outer parts to receive the engaging end of the levers j, which are held forward against the wheels i by springs k, connected with the said levers and with the cross-bars e. The inner ends of the levers j are curved to pass one-quarter around the axle B, and with them are interlocked the inner ends of the levers l. The levers j l pass along the inner sides of the arms of the cross-bars e and have arms m formed upon or rigidly attached to them. The arms m pass through slots in the arms of the cross-bars e and are pivoted to the said cross-bars. At the inner side of the cross-bars e the arms m are bent inward and extend nearly to the axle B. The arms m incline from the cross-bar e, so that they can be pushed toward the said cross-bar e to withdraw the inner ends of the levers j from the catch-wheels i, so that the wheels A can revolve without operating the seed-dropping mechanism.

To the rear cross-bar of the frame D are pivoted levers n, the lower arms of which are bent outward and downward, with an outward inclination, and have hooks formed upon their lower ends, so that when the lower arms of the levers n are swung outward the outward inclination of their arms will push the arms m that come in contact with them inward, and thus withdraw the levers j from the wheels i, and at the same time the hooks upon the lower ends of the said levers n catch upon the cross-bars e and hold them stationary, and thus prevent them from operating the seed-dropping apparatus. The upper arms of the levers n incline inward, so that they can be operated by the driver with his feet. The inner arms of the levers n should cross each other, so that they can both be operated by the driver at the same time, and can both be locked in place to hold the cross-bars e h stationary by a hook, o, hinged to the tongue E. The inner arms of the levers n are pressed upward to hold the lower arms of the said levers away from the cross-bars e by springs p, attached to the frame D, and which press against the said levers, as shown in the drawings.

Having thus fully described my invention, I claim as new and desire to secure by Letters Patent—

1. In a corn-planter, the combination, with the carriage A B C D, of the tubular seed-boxes G, having flanges H, the curved bars J, having series of perforations M and N, the shoes K, the hinging-pins I, and the fastening-pins L, substantially as herein shown and described, whereby the shoes can be adjusted to plant the seed at any desired depth in the ground, and can be readily raised from the ground, as set forth.

2. In a corn-planter, the combination, with the shoes K, provided with seed-apertures S, seed-boxes G, mounted on said shoes, slides U, rings Z, spring-pressed bars Y, pivoted to the rings Z at one end and the seed-slides near their opposite ends, and arms $b$, pivoted to the bars Y, of the wheels A, cross-bars $e$, adjustable trip-rods $d$, catch-wheels $i$, and spring-pressed catch-levers $j$, substantially as described, and for the purpose set forth.

3. The combination, with the cross-bar $e$, provided with the adjustable trip-rod $d$, seed-box G, and seed-slide U, of the spring-pressed bar Y, pivoted to the seed-slide, and arm $b$, pivoted to the bar Y, and provided with a stop, $b'$, whereby the bar Y is guarded from breakage should the wheel A be turned backward, substantially as described.

4. The combination of the seed-slide U, bar Y, pivoted thereto, arm $b$, pivoted to the bar Y, and provided with the stop $b'$, cross-bar $e$, catch-wheel $i$, and catch-levers $j$ $l$, having arms $m$, and holding-levers $n$, substantially as described, and for the purpose set forth.

JOSEPH MORAVA.

Witnesses:
J. A. WALSH,
ALLEN R. BUSHNELL.